(12) United States Patent
Nakamura

(10) Patent No.: US 12,093,215 B2
(45) Date of Patent: Sep. 17, 2024

(54) MANAGEMENT SERVER, DOCUMENT FILE MANAGEMENT SYSTEM, DOCUMENT FILE MANAGEMENT METHOD, AND DOCUMENT FILE MANAGEMENT PROGRAM

(71) Applicant: SKYCOM CORPORATION, Tokyo (JP)

(72) Inventor: Yoshikuni Nakamura, Miyazaki (JP)

(73) Assignee: SKYCOM CORPORATION, Tokyo (JP)

( * ) Notice: Subject to any disclaimer, the term of this patent is extended or adjusted under 35 U.S.C. 154(b) by 0 days.

(21) Appl. No.: 17/311,342

(22) PCT Filed: Nov. 26, 2020

(86) PCT No.: PCT/JP2020/043984
§ 371 (c)(1),
(2) Date: Jun. 6, 2021

(87) PCT Pub. No.: WO2021/106995
PCT Pub. Date: Jun. 3, 2021

(65) Prior Publication Data
US 2022/0283987 A1    Sep. 8, 2022

(30) Foreign Application Priority Data
Nov. 27, 2019   (JP) ................................ 2019-214608

(51) Int. Cl.
*G06F 16/11*   (2019.01)
*G06F 16/13*   (2019.01)
(Continued)

(52) U.S. Cl.
CPC .......... *G06F 16/122* (2019.01); *G06F 16/137* (2019.01); *G06F 16/93* (2019.01); *H04L 9/3236* (2013.01); *H04L 9/50* (2022.05)

(58) Field of Classification Search
CPC ...... G06F 16/122; G06F 16/93; G06F 16/137; H04L 9/50; H04L 9/3236
(Continued)

(56) References Cited

U.S. PATENT DOCUMENTS

2017/0366353 A1* 12/2017 Struttmann ......... G06F 21/6218
2018/0302417 A1* 10/2018 Wilson .................. H04L 9/3271
(Continued)

FOREIGN PATENT DOCUMENTS

JP         2013-045437 A      3/2013

*Primary Examiner* — Giovanna B Colan
(74) *Attorney, Agent, or Firm* — Apex Juris, pllc; Cera Oh

(57) ABSTRACT

Whether a document file is tampered and the like can be determined without imposing a burden on a user. A hash value calculation unit 103 adds contents of update to an original document as incremental update in order of update, and calculates a hash value of the document file for each of the original document and a document for adding the updated content and a hash value of a document file the hash value and the document file ID, identifying the document file, of which are registered in a blockchain network. An ID acquisition unit 102 acquires the document file ID identifying a received document file, from the document file. A hash value acquisition unit 105 acquires the hash value stored in the latest block among blocks storing the document file IDs from the blockchain network. A tampering determination unit 106 determines whether the document file is tampered by determining whether the hash value calculated and the hash value acquired from the blockchain network 300 match.

22 Claims, 12 Drawing Sheets

(51) Int. Cl.
G06F 16/93 (2019.01)
H04L 9/00 (2022.01)
H04L 9/32 (2006.01)

(58) Field of Classification Search
USPC .......................................................... 707/694
See application file for complete search history.

(56) References Cited

U.S. PATENT DOCUMENTS

2019/0318117 A1* 10/2019 Beecham ............ G06F 16/9024
2020/0394220 A1* 12/2020 Novotny ............. G06F 16/9024

* cited by examiner

MANAGEMENT SERVER, DOCUMENT FILE MANAGEMENT SYSTEM, DOCUMENT FILE MANAGEMENT METHOD, AND DOCUMENT FILE MANAGEMENT PROGRAM

TECHNICAL FIELD

The present invention relates to a management server, a document file management system, a document file management method, and a document file management program.

BACKGROUND ART

In recent years, electronic documents the contents on which can be easy added/modified and stored have been used instead of paper documents in any type of situations. In particular, a portable document format (PDF) file is widely used because it is less affected by a use environment of an information terminal device operated by a user, and can be printed or displayed on a screen with a low risk of the layout being ruined. Such an electronic document has been plagued by a problem in that if there are a plurality of almost identical electronic documents with only a partial modification, it is difficult to identify the modification once it has been made. A technique to address such a problem has been disclosed in which an official version of a document file and a provisional version of the document file are compared paragraph to paragraph, and a difference therebetween is extracted by full text comparison (see Patent Literature 1).

CITATION LIST

Patent Literature

Patent Literature 1: Japanese Patent Application Laid-Open No. 2013-045437

SUMMARY OF INVENTION

Technical Problem

Unfortunately, the technique described in Patent Literature 1 described above is plagued by the following problems. Specifically, the required processing time is long, because of the need for performing the full text comparison between the entire target portions. Furthermore, the management of the document files is cumbersome, because of the need for the user him or herself to be aware whether the document files are the official version or the revised version, to manage the document files.

The present invention has been made in view of the above, and an object of the present invention is to provide a management server, a document file management system, a document file management method, and a document file management program with which whether a document file is tampered, whether the document file is the latest version, and whether a document file that is the registration target can be registered can be determined without imposing a burden on a user.

Solution to Problem

To solve the problem described above, the present invention is characterized in that contents of update to an original document are added to the original document as incremental update in the order of update, a hash value of a document file and a document file ID identifying the document file of which are registered in a blockchain network is received from an information terminal device for each of the original document and a document for adding the updated content, a hash value of the received document file is calculated, the document file ID included in the received document file is acquired, a hash value stored in the latest block among blocks storing the acquired document file ID is acquired from the blockchain network, and whether the calculated hash value and the acquired hash value match is determined to determine whether the document file is tampered.

The present invention is further characterized in that the document file ID identifying a document file that is a checking target is acquired from the document file, a hash value of the document file is calculated, and information on the document file stored in the latest block among blocks storing the document file ID is compared with information on the document file stored in the block storing the hash value of the document file ID and the hash value of the document file, to determine whether the document file that is the checking target is the latest.

The present invention is further characterized in that a document file ID identifying a document file that is a registration target is acquired from the document file, whether a file size of the document file is larger than a file size stored in the latest block among blocks storing the document file ID is determined, a hash value of the document file from the beginning to the file size stored in the latest block is calculated, and when the file size of the document file is determined to be larger than the file size stored in the latest block and when the hash value stored in the latest block matches the hash value of the document file calculated, the document file is determined to be able to be registered.

Advantageous Effects of Invention

The present invention configured as described above provides an effect of making it possible to determine whether the document file is tampered, whether the document file is the latest version, and whether the document file that is a registration target can be registered without imposing a burden on the user.

DESCRIPTION OF EMBODIMENTS

Embodiments of the present invention will be described below with reference to the accompanying drawings. Note that the following description is given on exemplary embodiments, and the present invention is not limited to such embodiments.

First Embodiment

Figure 1:
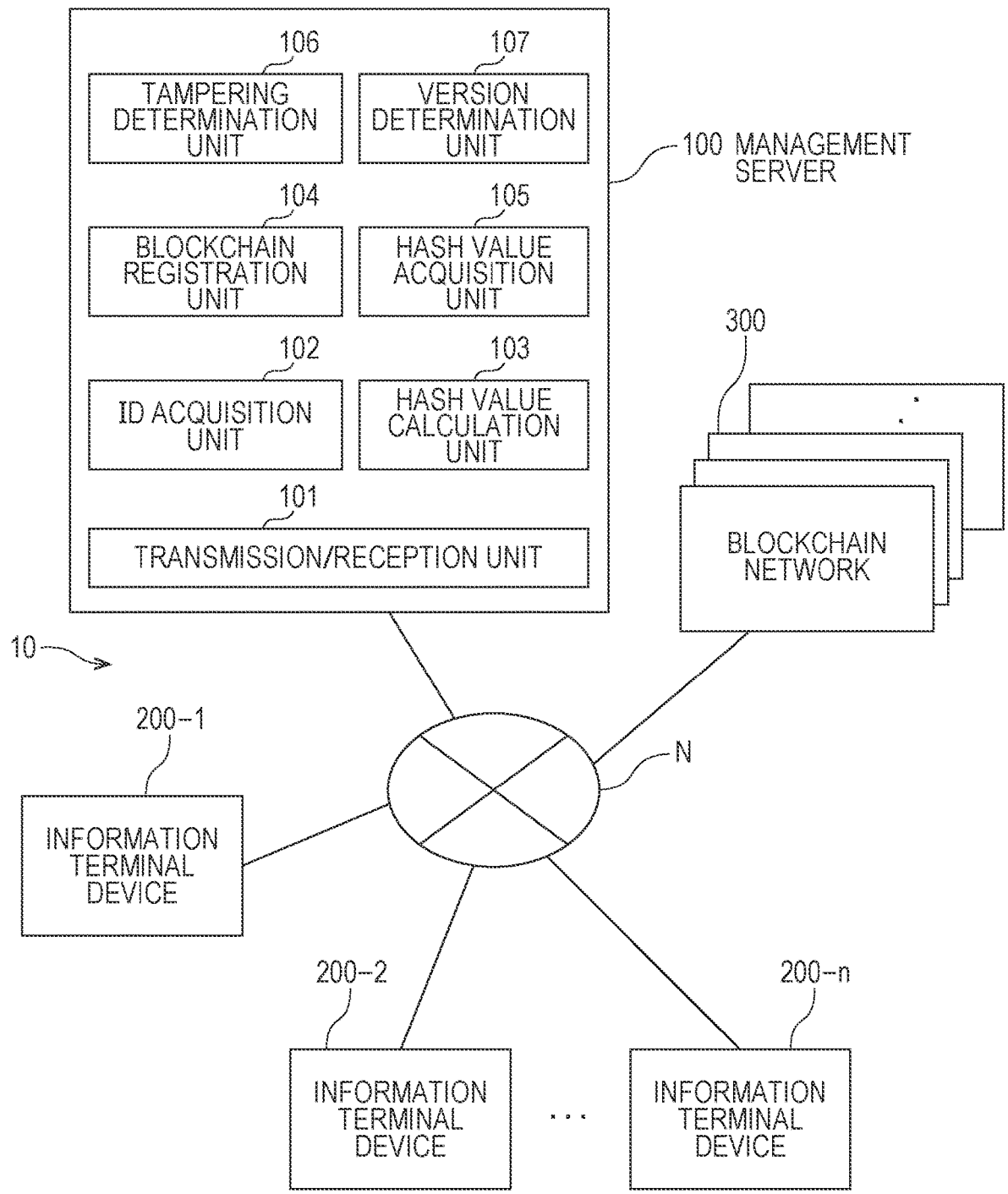
FIG. 1 is a block diagram illustrating a configuration of a document file management system 10 according to a first embodiment.

FIG. 1 is a block diagram illustrating a configuration of a document file management system 10 according to a first embodiment. The document file management system 10 includes a management server 100, information terminal devices 200-1 to n (hereinafter, referred to as an information terminal device 200), and a blockchain network 300. As illustrated in FIG. 1, the management server 100, the information terminal device 200, and the blockchain network 300 are communicably connected to each other via a network N. The network N is any communication network such as the Internet, an intranet, a local area network (LAN), a virtual private network (VPN), or a mobile communication network, and a combination of these, and a part or all of the network N may be a wired or wireless network.

The management server 100 is a server that registers information on a document file received from the information terminal device 200 in the blockchain network 300, and determines whether the document file is tampered, whether the document file is the latest version, whether the document file that is the registration target registered can be registered, and the like by using the blockchain network 300. The management server 100 includes a transmission/reception unit 101, an ID acquisition unit 102, a hash value calculation unit 103, a blockchain registration unit 104, a hash value acquisition unit 105, a tampering determination unit 106, and a version determination unit 107.

The transmission/reception unit 101 receives a document file and a registration request transmitted from the information terminal device 200. The transmission/reception unit 101 transmits information on the received document file to the blockchain network 300. The transmission/reception unit 101 receives the document file and various checking requests transmitted from the information terminal device 200, and transmits a checking result to the information terminal device 200.

When a document file ID is stored in the document file received together with the document registration request, the ID acquisition unit 102 acquires the document file ID. When the document file ID is not stored in the document file, the ID acquisition unit 102 generates the document file ID and stores the generated document file ID in the document file. The document file ID is information for uniquely identifying the document file, and may be any information that can uniquely identify the document file, such as a document name.

The hash value calculation unit 103 calculates a hash value of the document file. The hash value calculation unit 103 calculates a hash value of the document file from the beginning to the file size. This document file is a PDF file as an example that is a single document file with the contents of update, made during editing on an original document first created, added as incremental update in the order of the update. Note that the document file may be a file other than a PDF file as long as updated contents can be added to the document file. In the present embodiment, a case where the document file is a PDF file will be mainly described.

The blockchain registration unit 104 transmits the document file ID, the hash value, the version information, the file size, and the like of the document file (document file including the document file ID), for which the registration request has been issued, to the blockchain network 300, and stores the document file ID, the hash value, the version information, the file size, the registration date and time, and the like in a block in the blockchain network 300.

Note that the registration date and time is automatically recorded when the block is stored in the blockchain network 300. In the blockchain network 300, blocks storing the document file ID, the hash value, the version information, the file size, the registration date and time, and the like of the document file, for which the registration request has been issued, are stored in order of registration.

The hash value acquisition unit 105 acquires the document file ID stored in the document file, and transmits the acquired document file ID to the blockchain network 300, to acquire the hash value from the block, in the blockchain network 300, with the matching document file ID. In addition to the hash value, the hash value acquisition unit 105 acquires the file size, the version information, the registration date and time, and the like stored in the block. When a plurality of blocks storing the same document file ID are stored, the hash value acquisition unit 105 acquires a plurality of hash values, file sizes, pieces of version information, registration dates and times, and the like of the respective block.

The tampering determination unit 106 determines whether the tampering has been done, based on a result of comparing the hash value calculated from the document file and the hash value acquired by the hash value acquisition unit 105. The tampering determination unit 106 determines that there is no tampering when the hash value calculated from the document file matches the hash value acquired by the hash value acquisition unit 105, and determines that a tampering has been done when the hash values do not match.

Based on the hash value, the file size, and the version information different among versions of a single document file stored in the block of the blockchain network 300, the version determination unit 107 determines the version information on the document file that is a checking target, whether an update has been made but not registered in the blockchain network 300, whether the document file that is the checking target is the latest version, and the like.

The information terminal device 200 is a personal computer, a tablet terminal, a smartphone, or the like operated by a user who desires to manage tampering or a version of a document file. The information terminal device 200 transmits various requests to the management server 100, and receives and displays a response to the request.

The blockchain network 300 is a system using a so-called distributed ledger technology, and in the present embodiment, and has blocks storing a document file ID, a hash value of the document file, a file size and the version information, and the like of the document file transmitted to the blockchain network 300, in the order of registration. To acquire, from each block, a hash value of the document file, a file size of the document file, version information, registration date and time, and the like stored in the block, the document file ID is transmitted to the blockchain network 300.

Figure 2:
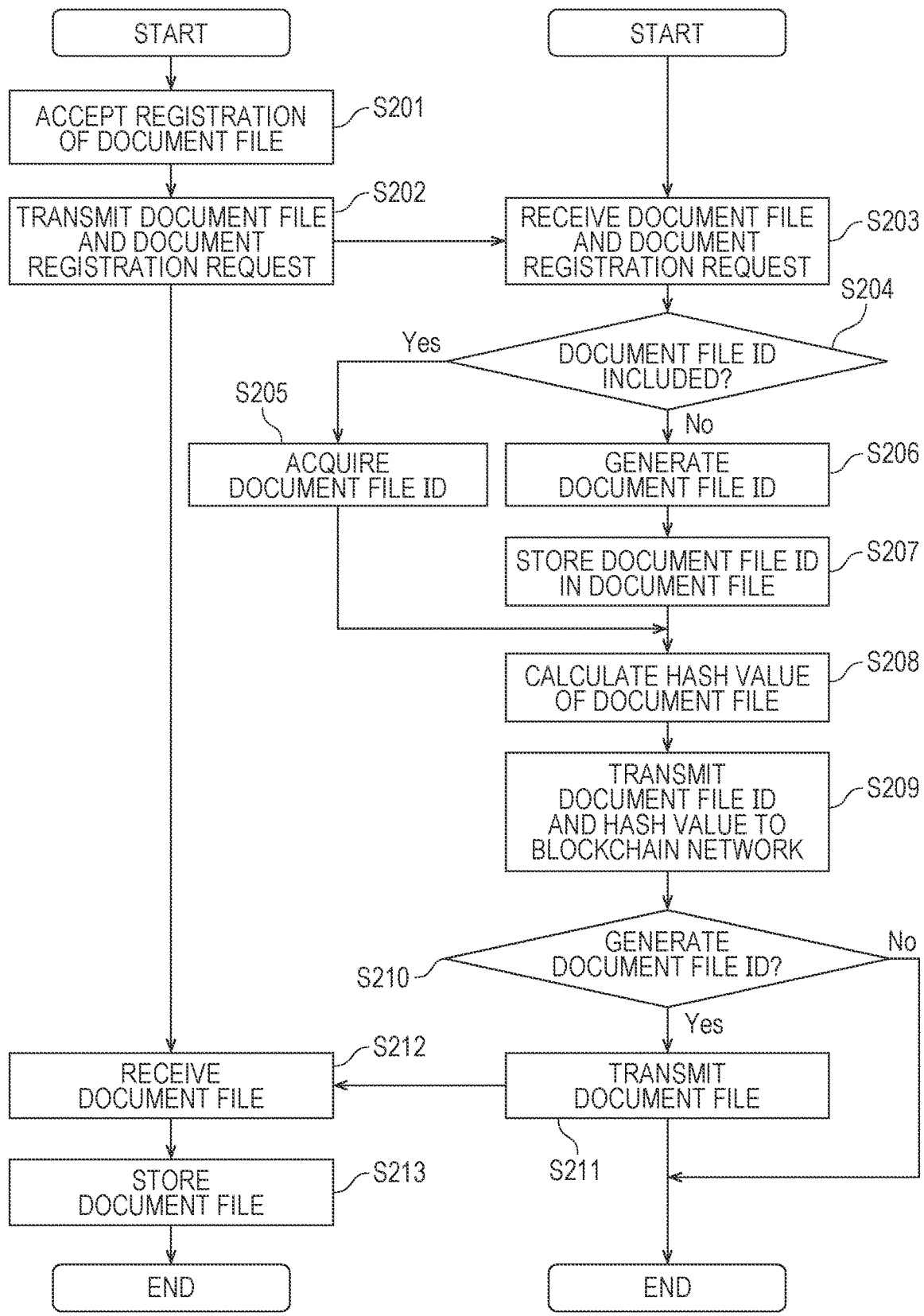
FIG. 2 is a flowchart illustrating a procedure of document file registration processing executed by a management server 100 and an information terminal device 200.

Document file registration processing executed by the document file management system 10 configured as described above will be described. FIG. 2 is a flowchart illustrating a procedure of the document file registration processing executed by the management server 100 and the information terminal device 200.

The information terminal device 200 accepts the registration of a document file (step S201). The information terminal device 200 transmits the document file and the document registration request to the management server 100 (step S202).

In the management server 100, the transmission/reception unit 101 receives the document file and the document registration request (step S203). The ID acquisition unit 102 determines whether the document file ID is stored in the document file (step S204). When the document file ID is determined to be stored in the document file (step S204: Yes), the ID acquisition unit 102 acquires the document file ID from the document file (step S205).

When the document file ID is determined not to be stored in the document file (step S204: No), the ID acquisition unit 102 generates the document file ID (step S206). The ID acquisition unit 102 stores the document file ID in the document file (step S207). The hash value calculation unit 103 calculates a hash value of the document file (step S208). The transmission/reception unit 101 transmits the document file ID and the hash value of the document file to the blockchain network 300 (step S209). As a result, the document file ID and the hash value are stored in a block of the blockchain network 300. In addition to the document file ID and the hash value, a file size, version information, and the like may be transmitted to the blockchain network 300 to be stored in the block of the blockchain network 300. The transmission/reception unit 101 determines whether the document file ID is generated by the ID acquisition unit 102 (step S210). When it is determined that the document file ID has not been generated (step S210: No), the processing ends. Upon determining that the document file ID is generated (step S210: Yes), the transmission/reception unit 101 transmits the document file to the information terminal device 200 (step S211).

The information terminal device 200 receives the document file (step S212).

The information terminal device 200 stores the document file (step S213). More specifically, the information terminal device 200 replaces the document file transmitted to the management server 100 with the document file received from the management server 100. As a result, even a document file, stored in the information terminal device 200, not originally having a document file ID, can be linked with the information stored in the block in the blockchain network 300 using a document file ID.

With the document file ID included in the document file and with the information on the document file stored in a block in the blockchain network 300 in association with a document file ID as described above, the document file ID used as a key for searching the blockchain network 300 can be acquired from the document file itself. Thus, no mechanism (such as a database for example) for associating a document file and a document file ID needs to be provided, and reference can be made on the information, on the document file, stored in the blockchain network 300, using the document file only.

Furthermore, with the version information stored in the block as information on the document file, when the version of the document file is more than one, the information on each version of the document file can be stored and the hash value of each version of the document file can be held in the block of the blockchain network 300.

Figure 3:
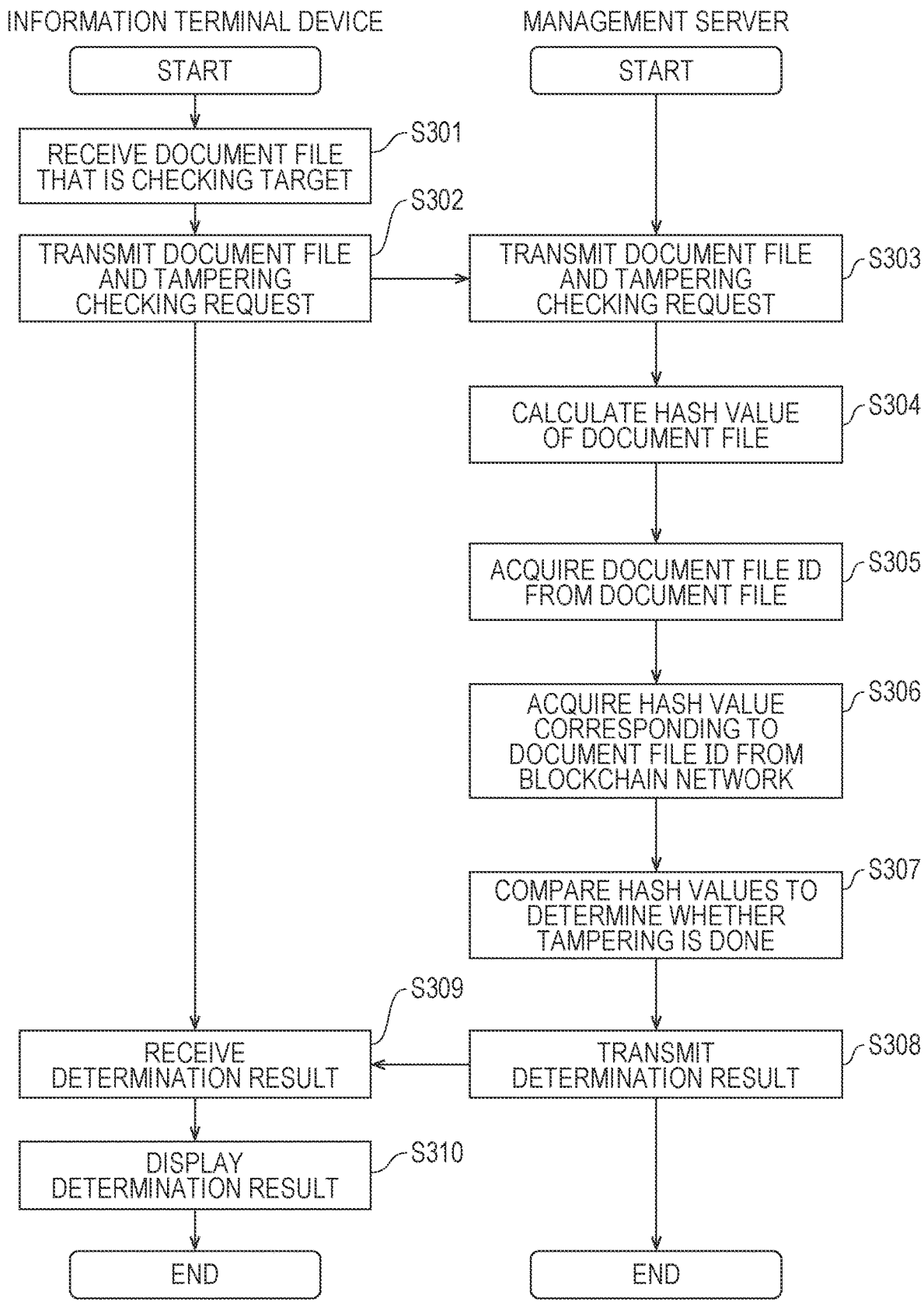
FIG. 3 is a flowchart illustrating a procedure of document file tampering checking processing executed by the management server 100 and the information terminal device 200.

Next, document file tampering checking processing executed by the document file management system 10 will be described. FIG. 3 is a flowchart illustrating a procedure of the document file tampering checking processing executed by the management server 100 and the information terminal device 200.

The information terminal device 200 receives the document file that is the checking target (step S301). For example, the document file selected from a list of document files may be received. The information terminal device 200 transmits the document file and a tampering checking request to the management server 100 (step S302).

The transmission/reception unit 101 of the management server 100 receives the document file and the tampering checking request from the information terminal device 200 (step S303). The hash value calculation unit 103 calculates a hash value of the received document file (step S304). The ID acquisition unit 102 acquires the document file ID from the document file (step S305). The hash value acquisition unit 105 acquires the hash value associated with the document file ID from the blockchain network 300 (step S306). When the document files of different versions are stored in the blockchain network 300, the tampering checking processing may be executed to check whether a tampering has been done, through comparison with a hash value included in a block (hereinafter, referred to as the latest block) which is most newly registered in the blockchain network 300, among the blocks storing the document file IDs acquired from the document files.

The tampering determination unit 106 determines whether the document file is tampered based on a result of comparison between the hash value of the document file calculated by the hash value calculation unit 103 and the hash value acquired from the blockchain network 300 (step S307).

More specifically, when the hash value of the document file that is the checking target matches the hash value stored in the blockchain network 300, the tampering determination unit 106 determines that the document file that is the checking target is not a result of tampering on the document file the hash value of which is stored in the blockchain network 300. When the hash value of the document file that is the checking target does not match the hash value of the document file stored in the blockchain network 300, the tampering determination unit 106 determines that the document file that is the checking target is a result of tampering on the document file the hash value of which is stored in the blockchain network 300.

The transmission/reception unit 101 transmits a result of determination related to tampering by the tampering determination unit 106 to the information terminal device 200 (step S308).

The information terminal device 200 receives the result of determination related to tampering from the management server 100 (step S309). The information terminal device 200 displays the result of determination on tampering on a display section (step S310).

As described above, with the document file acquired by the user transmitted to the management server 100, whether the content of the document file is tampered can be determined. Furthermore, whether the document file is tampered can be determined using the information on the document file stored in the block of the blockchain network 300, so that whether the tampering has been done can be determined without using an electronic signature system or the like. Although it has been described above that the content of update can be added as an incremental update, the document file that is the target of tampering check may be a document file with no content of update added.

In the above-described processing, when it is determined that the document file that is the checking target is not tampered, the registration date and time automatically recorded in the block of the blockchain network 300 may be acquired to prove that the document file has existed at the registration date and time.

Figure 4:
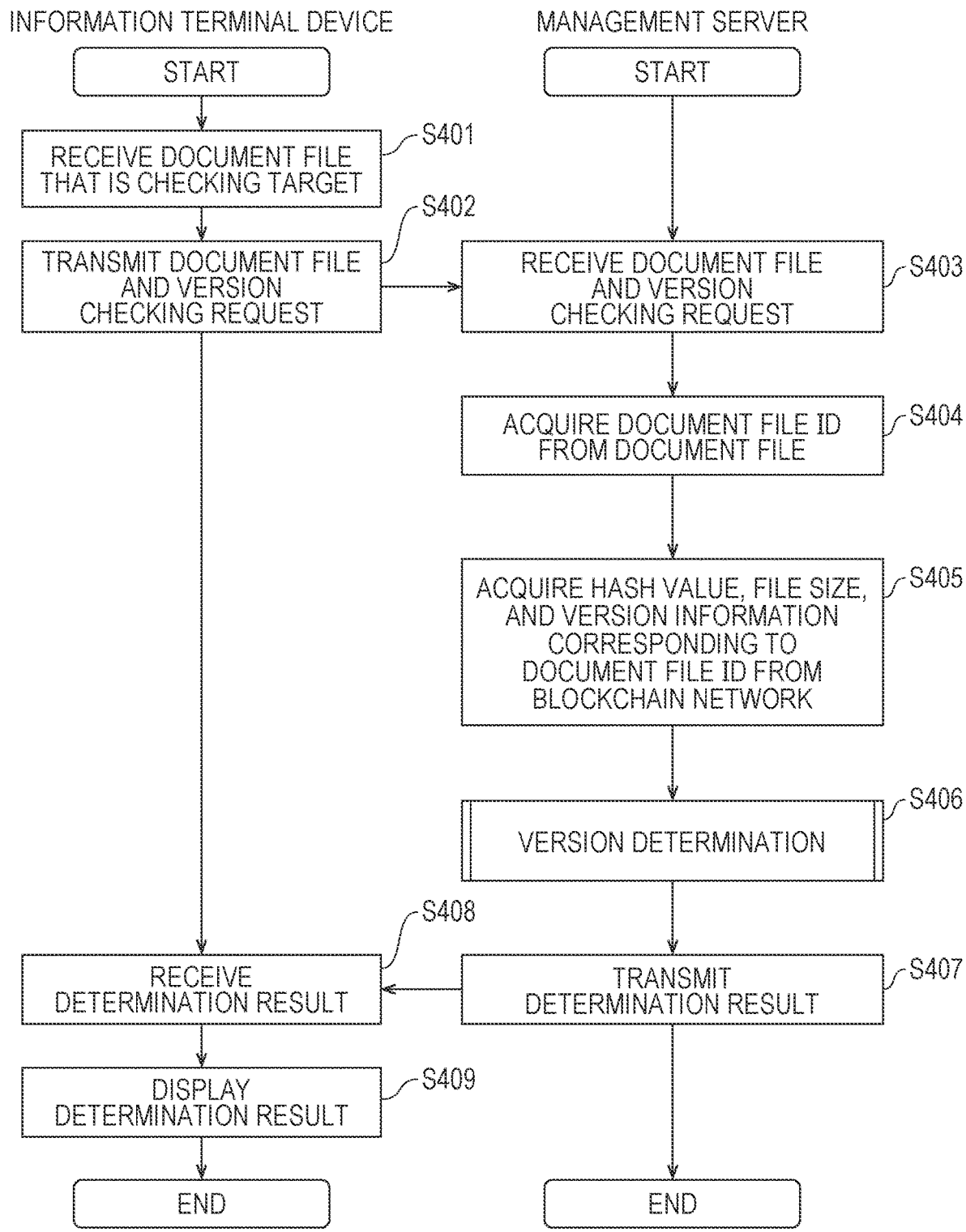
FIG. 4 is a flowchart illustrating a procedure of document file version checking processing executed by the management server 100 and the information terminal device 200.

Next, document file version checking processing executed by the document file management system 10 will be described. FIG. 4 is a flowchart illustrating a procedure of the document file version checking processing executed by the management server 100 and the information terminal device 200.

The information terminal device 200 receives the document file that is the checking target (step S401). For example, a document file may be selected from a list of document files to be received, and a menu for version check may be selected. The information terminal device 200 transmits the document file and a version checking request to the management server 100 (step S402).

The transmission/reception unit 101 of the management server 100 receives the document file and the version checking request from the information terminal device 200 (step S403). The ID acquisition unit 102 acquires the document file ID from the document file (step S404). The hash value acquisition unit 105 acquires the hash value and the file size associated with the document file ID and the version information from the blockchain network 300 (step S405). In the version checking processing, a plurality of hash values, file sizes, and pieces of version information corresponding to the document file ID are acquired, because information on a plurality document files of different versions are expected to be stored in the blockchain network 300. The version determination unit 107 executes version determination processing (step S406). Details will be described later with reference to FIGS. 5 and 7. The transmission/reception unit 101 transmits a result of determination related to the version of the document file to the information terminal device 200 (step S407).

The information terminal device 200 receives the result of determination related to the version of the document file from the management server 100 (step S408). The information terminal device 200 displays the result of the determination related to the version of the document file on the display section (step S409).

Figure 5:
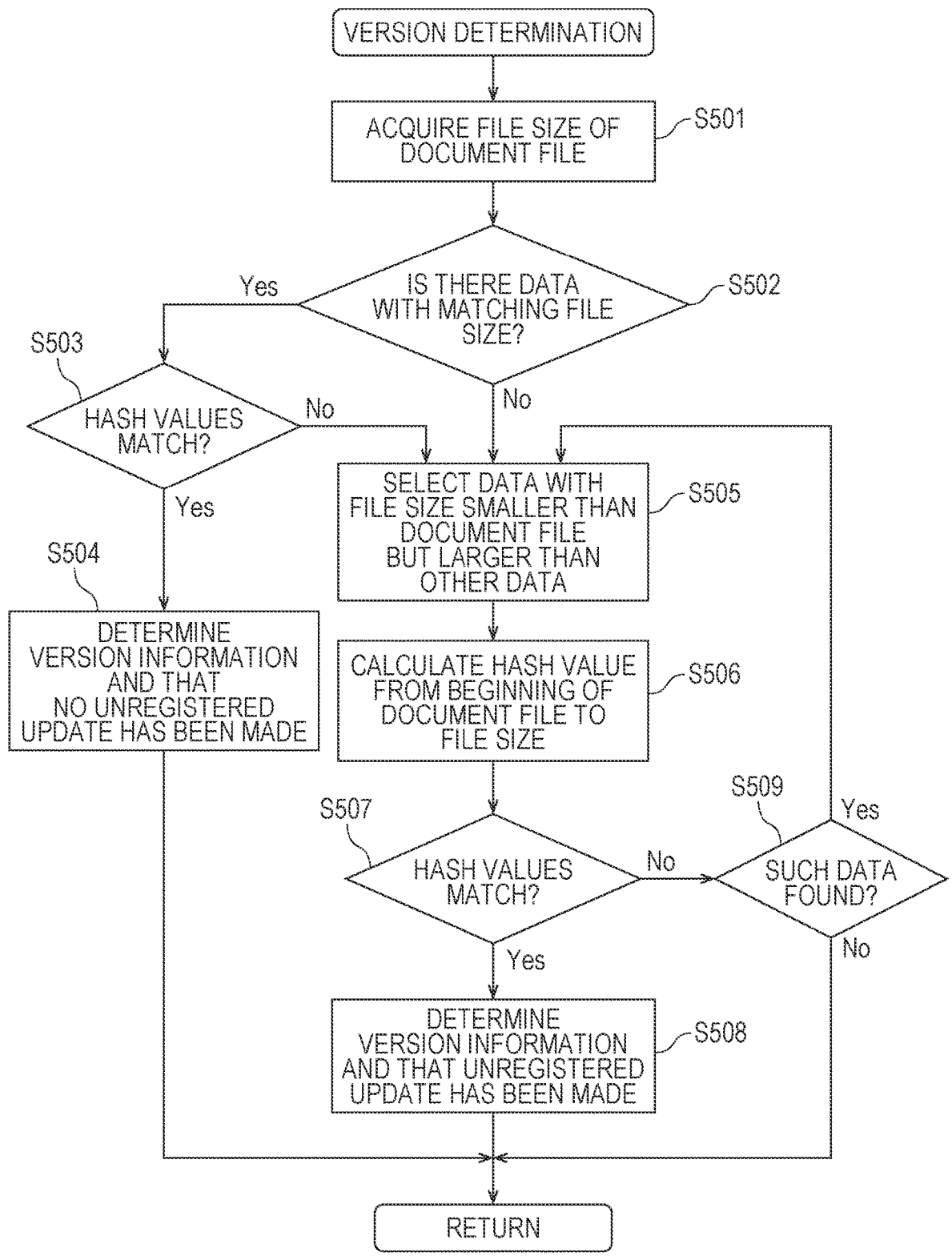
FIG. 5 is a flowchart illustrating a procedure of version determination processing executed by the management server 100.

Next, the version determination processing executed by the management server 100 will be described. FIG. 5 is a flowchart illustrating a procedure of the version determination processing executed by the management server 100.

Figure 6:
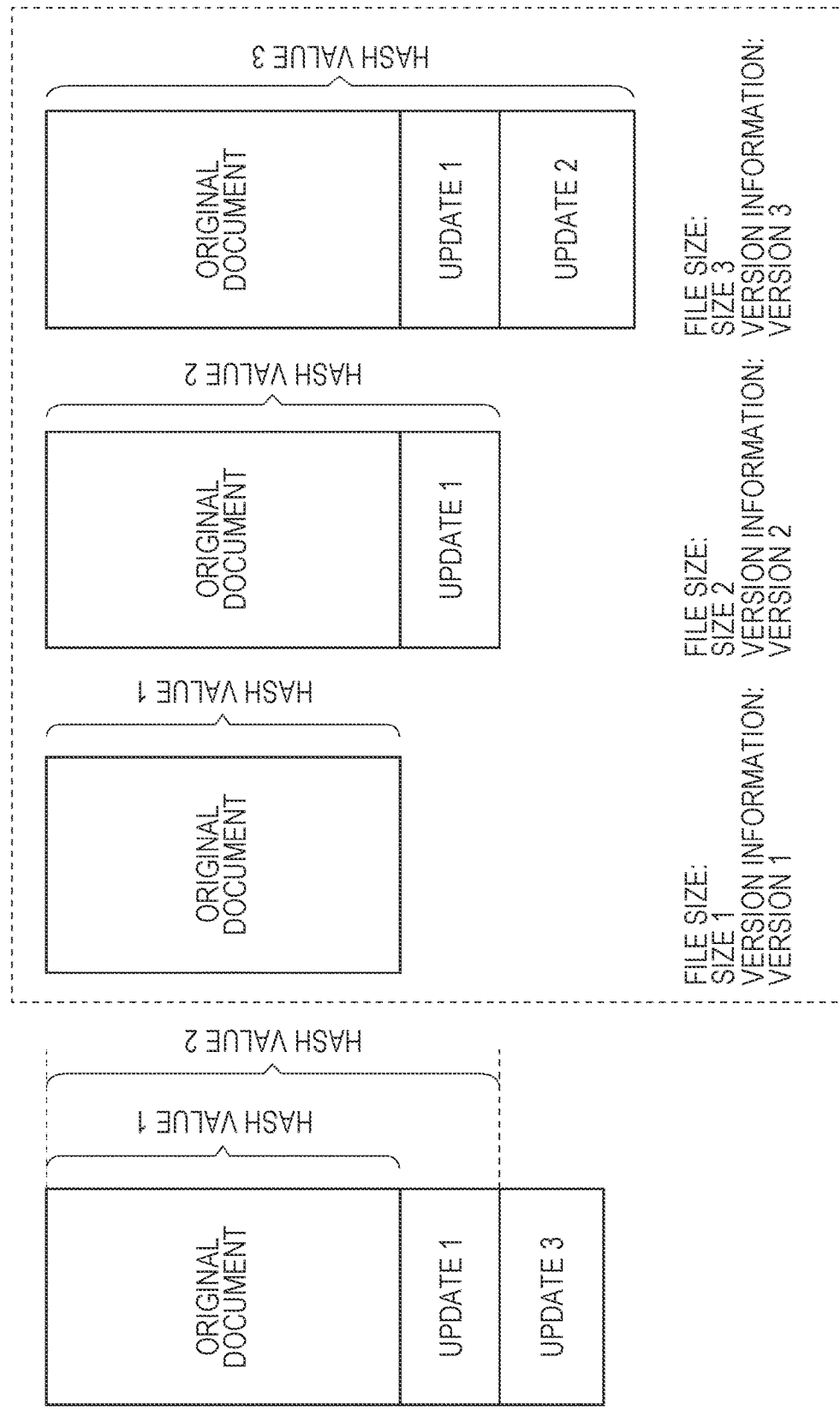
FIG. 6 is an explanatory diagram illustrating an example of an image of a hash value of a document file that is a checking target and a hash value of a document file stored in a block of a blockchain network.

The version determination unit 107 acquires the file size of the document file that is the checking target (step S501). The version determination unit 107 determines whether data corresponding to the document file ID acquired from the blockchain network 300 includes data matching the file size of the document file (step S502). FIG. 6 is an explanatory diagram illustrating an example of an image of a hash value of a document file that is a checking target and a hash value of a document file stored in a block of a blockchain network. In the example illustrated in FIG. 6, hash values, file sizes, and pieces of version information, which are data on three versions, are acquired from blocks stored in the blockchain network 300, and whether the data includes data with the matching size is determined. In the case shown in FIG. 6, there is no matching data.

Upon determining that there is data that matches the file size of the document file (step S502: Yes), the version determination unit 107 determines whether hash values match (step S503). Upon determining that the hash values match (step S503: Yes), the version determination unit 107 determines the version information on the document file that is the checking target and that no unregistered update has been made (step S504). It can be determined that the version of the document file as the checking target is version information of data with the matching file size and the matching hash value. Furthermore, it can be determined that there is no data further added to the document file corresponding to the version information, that is, there is no updated content added to the blockchain network 300 but not registered, since the file size of the data stored in the blockchain network 300 matches. When it is determined that the hash values do not match (step S503: No), the processing proceeds to step S505.

Upon determining that there is no data that matches the file size of the document file (step S502: No), that is, upon determining that an updated content has been added to the blockchain network 300 but is not registered, the version determination unit 107 selects data with a file size smaller than the file size of the document file but larger than that of other data (step S505). In the example illustrated in FIG. 6, data with version information "Version 2" is selected.

The hash value calculation unit 103 calculates a hash value of data of the document file from the beginning to the file size (step S506). In the example illustrated in FIG. 6, the hash value of the data from the beginning of the document file that is the checking target to "size 2" which is the file size of "version 2", that is, to original document+update 1 is calculated. The version determination unit 107 determines whether the hash value of the selected data matches the calculated hash value (step S507).

When it is determined that the hash value matches (step S507: Yes), the version determination unit 107 determines the version information on the document file that is the checking target and that an unregistered update has been made (step S508). It can be determined that the version of the document file as the checking target is version information of data with the matching hash value. Furthermore, it can be determined that there is an updated content added to the blockchain network 300 but not registered, since the file size of the data stored in the blockchain network 300 does not match.

Upon determining that the hash values do not match (step S507: No), the version determination unit 107 determines whether there is data corresponding to the document file ID acquired from the blockchain network 300 (step S509).

When it is determined that there is such data (step S509: Yes), the processing returns to step S505 and the next processing is executed. When it is determined that there is no such data (step S509: No), the processing ends.

With the document file acquired by the user thus transmitted to the management server 100, the version information on the document file as the checking target and whether the unregistered update has been made on the document file as the checking target can be checked. Furthermore, since the information on the version of the document file is stored in the block of the blockchain network 300, the version can be managed without using an electronic signature system or the like.

Since the registration date and time when the information on the document file is stored in the block of the blockchain network 300 is automatically recorded in a block of the blockchain network 300, it is also possible to prove the date and time when the document file of each version has existed.

Figure 7:
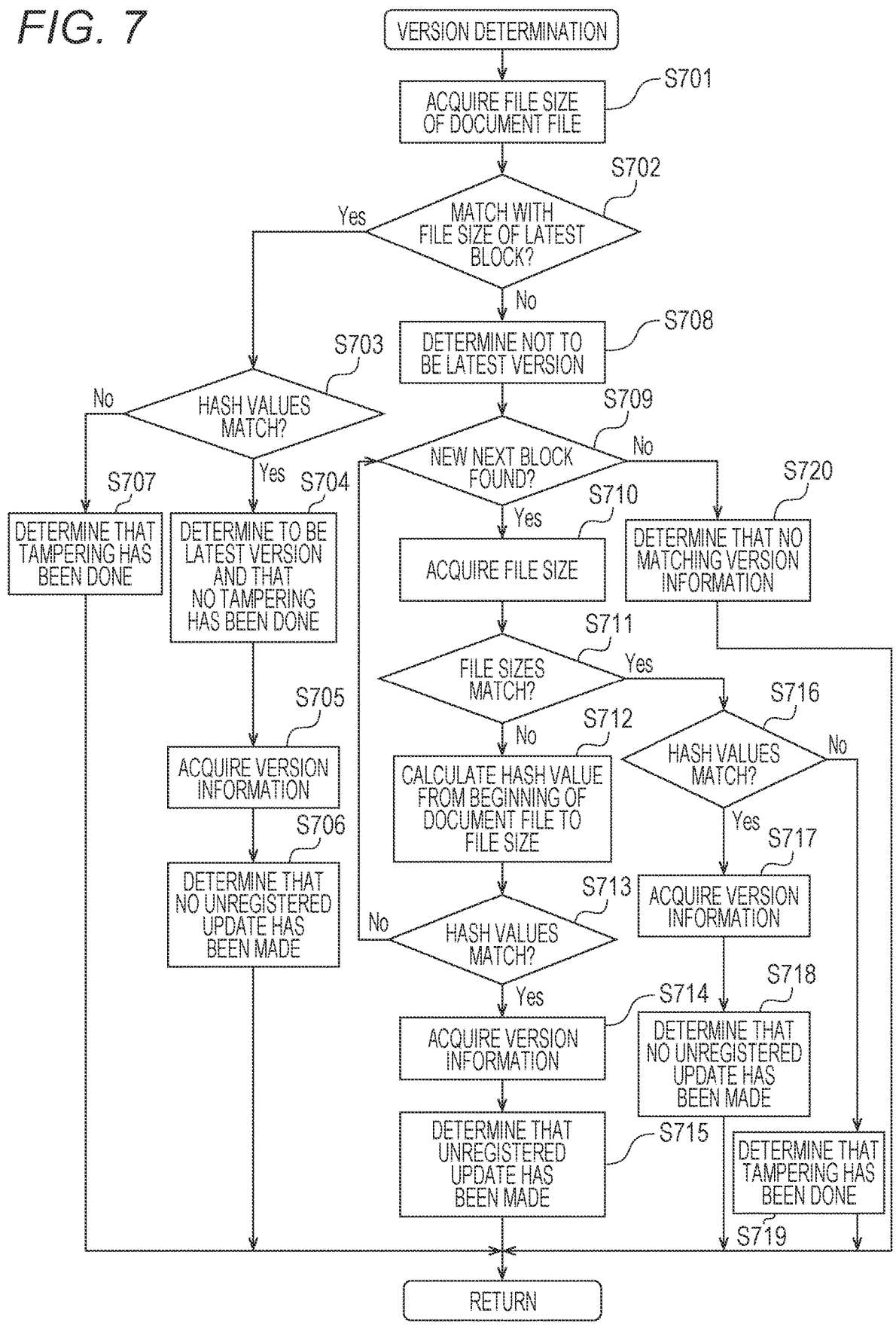
FIG. 7 is a flowchart illustrating a procedure of version determination processing executed by the management server 100.

Another version determination processing executed by the management server 100 will be described. In this processing, determination on whether the document file that is the checking target is the latest version is additionally performed. FIG. 7 is a flowchart illustrating a procedure of the version determination processing executed by the management server 100.

The version determination unit 107 acquires the file size of the document file that is the checking target (step S701). The version determination unit 107 determines whether the file size of the document file that is the checking target matches the file size of the document file stored in the latest block among the blocks storing the document file ID acquired from the blockchain network 300 (step S702).

Upon determining that the file size of the document file that is the checking target matches the file size of the document file stored in the latest block (step S702: Yes), the version determination unit 107 determines whether the hash value of the document file that is the checking target matches the hash value stored in the latest block (step S703). When it is determined that the hash values match (step S703: Yes), the version determination unit 107 determines that the document file that is the checking target is the latest version and is not tampered (step S704). The version determination unit 107 acquires version information stored in the latest block as the version of the document file that is the checking target (step S705). The version determination unit 107 determines that no unregistered update has been made on the document file that is the checking target (step S706). Upon determining that the hash value of the document file that is the checking target does not match the hash value stored in the latest block (step S703: No), the version determination unit 107 determines that the document file that is the checking target is tampered (step S707).

Upon determining that the file size of the document file that is the checking target does not match the file size of the document file stored in the latest block (step S702: No), the version determination unit 107 determines that the document file that is the checking target is not the latest version (step S708). The version determination unit 107 determines whether there is a new next block (step S709). More specifically, the version determination unit 107 determines whether a hash value, a file size, version information, registration date and time, and the like to be stored in a new block next to the currently acquired block are acquired.

Upon determining that there is a new next block (step S709: Yes), the version determination unit 107 acquires a file size stored in the new next block (step S710). The version determination unit 107 determines whether the file size of the document file that is the checking target matches the file size stored in the new next block (step S711). Upon determining that the file size of the document file that is the checking target does not match the file size stored in the new next block (step S711: No), the hash value calculation unit 103 calculates a hash value of the file size stored in the new next block from the beginning of the document file (step S712). Next, the version determination unit 107 determines whether the hash value stored in the new next block matches the calculated hash value (step S713).

Next, when it is determined that the hash value included in the new next block does not match the calculated hash value (step S713: No), the processing returns to step S709.

Next, when it is determined that the hash value stored in the new next block matches the calculated hash value (step S713: Yes), the version determination unit 107 acquires version information stored in the new next block as the version of the document file that is the checking target (step S714). The version determination unit 107 determines that an unregistered update has been made on the document file that is the checking target (step S715).

Upon determining that the file size of the document file that is the checking target matches the file size stored in the new next block (step S711: Yes), the version determination unit 107 determines whether the hash value of the document file that is the checking target matches the hash value stored in the new next block (step S716). Upon determining that the hash values match (step S716: Yes), the version determination unit 107 acquires version information stored in the new next block as the version of the document file that is the checking target (step S717). The version determination unit 107 determines that no unregistered update has been made on the document file that is the checking target (step S718). Upon determining that the hash values do not match (step S716: No), the version determination unit 107 determines that the document file that is the checking target is tampered (step S719).

Upon determining that there is no new next block (step S709: No), the version determination unit 107 determines that there is no version information matching the document file that is the checking target (step S720).

With the file size and the hash value of the checking target document file sequentially thus checked from the latest block stored in the blockchain network 300, the version information on the document file that is the checking target, whether the unregistered update has been made, and whether the document file that is the checking target is the latest version can be determined.

Figure 8:
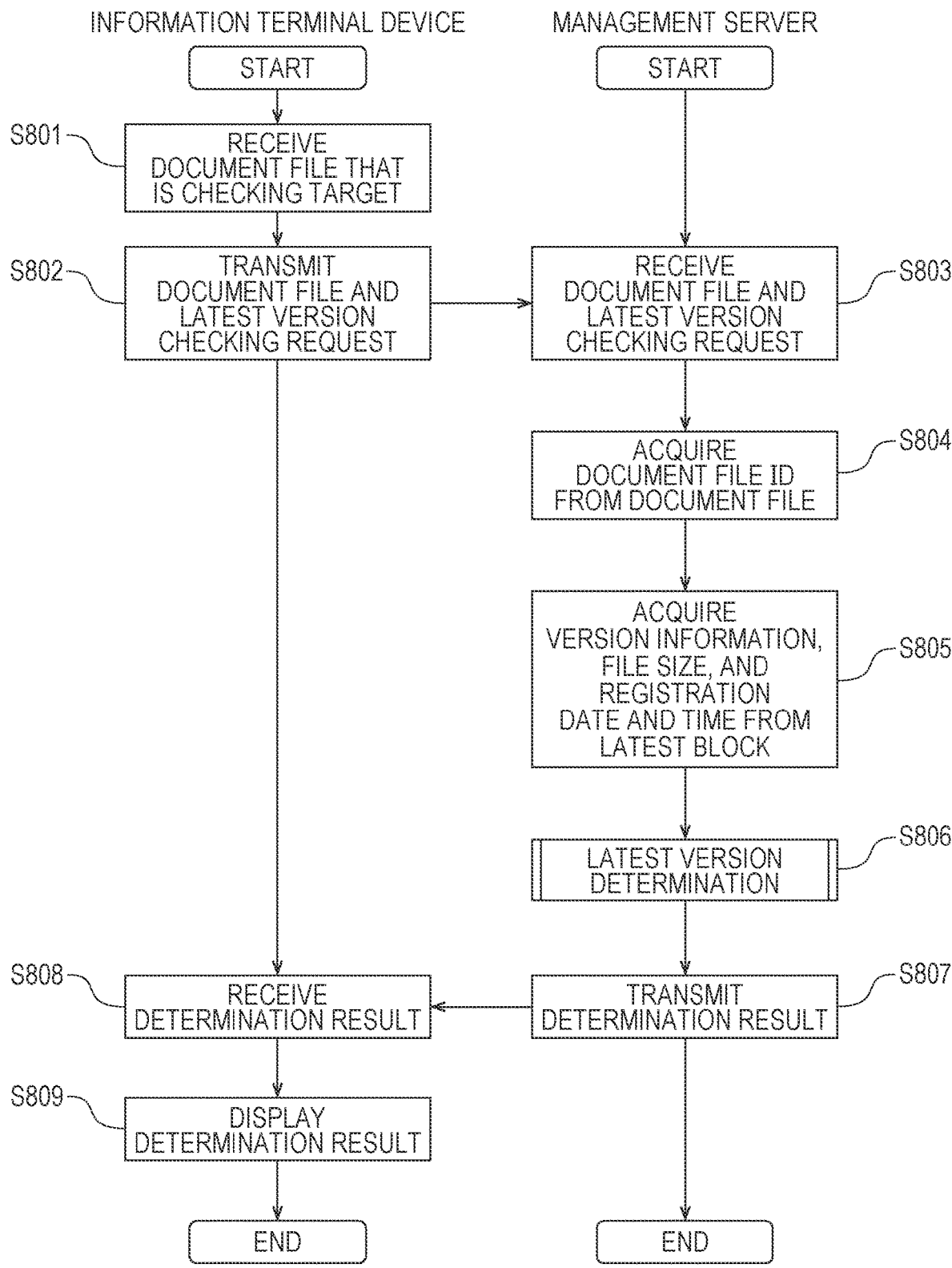
FIG. 8 is a flowchart illustrating a procedure of latest version checking processing for a document file executed by the management server 100 and the information terminal device 200.

Next, processing of checking whether the document file that is the checking target is the latest version will be described. FIG. 8 is a flowchart illustrating a procedure of the latest version checking processing for the document file executed by the management server 100 and the information terminal device 200.

The information terminal device 200 receives the document file that is the checking target (step S801). For example, a document file may be received by being selected from a list of document files, and a menu for latest version checking may be selected. The information terminal device 200 transmits the document file and a latest version checking request to the management server 100 (step S802).

The transmission/reception unit 101 of the management server 100 receives the document file and the latest version checking request from the information terminal device 200 (step S803). The ID acquisition unit 102 acquires the document file ID from the document file (step S804). The hash value acquisition unit 105 acquires the version information, the file size, and the registration date and time from the latest block storing the document file ID of the document file, stored in the blockchain network 300 (step S805). The version determination unit 107 executes latest version determination processing (step S806). Details will be described later with reference to FIG. 9. The transmission/reception unit 101 transmits a result of determining whether the document file is the latest version to the information terminal device 200 (step S807).

The information terminal device 200 receives the result of determining whether the document file is the latest version from the management server 100 (step S808). The information terminal device 200 displays the determination result on the display section (step S809).

Figure 9:
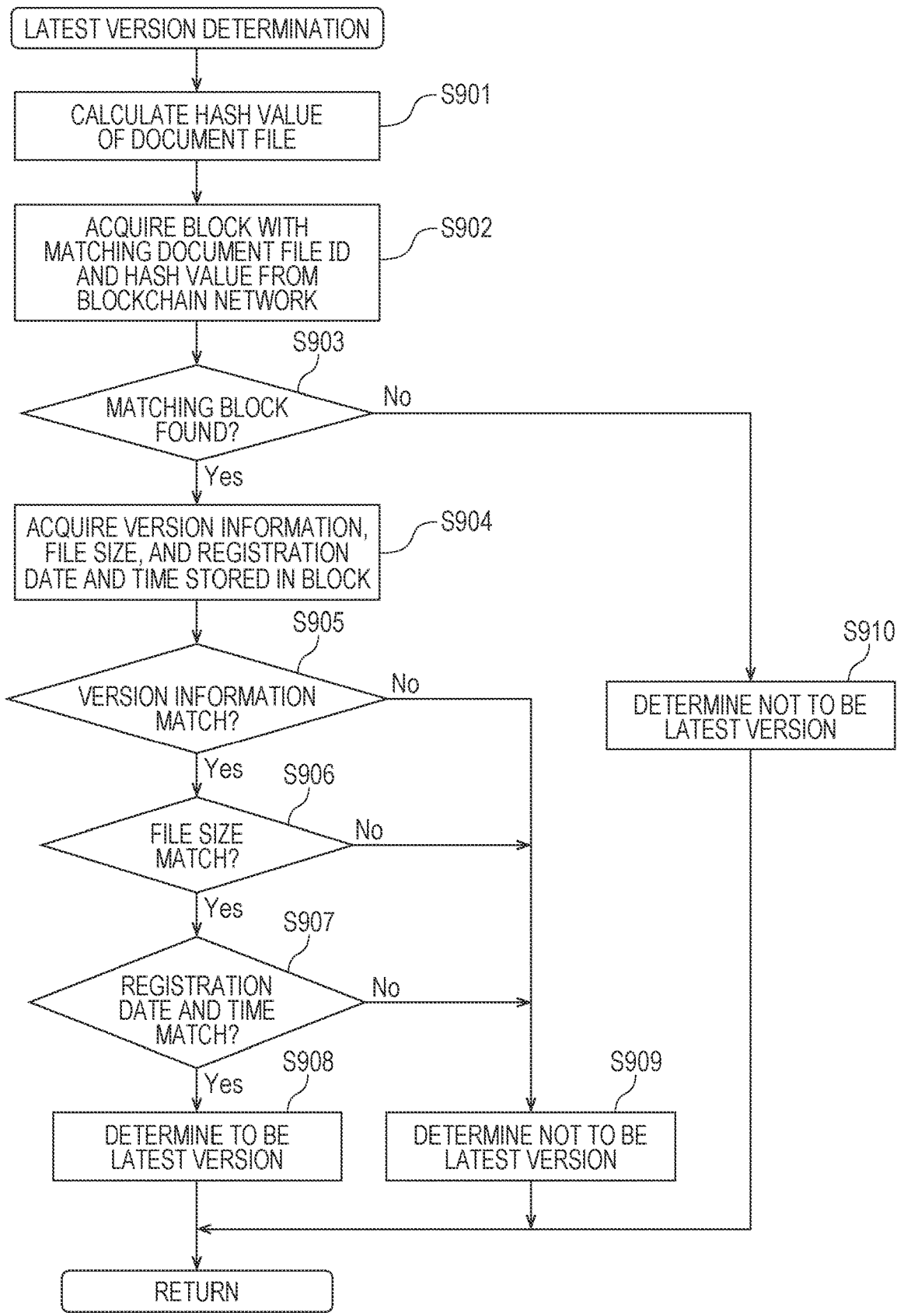
FIG. 9 is a flowchart illustrating a procedure of the latest version determination processing executed by the management server 100.

Next, the latest version determination processing executed by the management server 100 will be described. FIG. 9 is a flowchart illustrating a procedure of the latest version determination processing executed by the management server 100.

The hash value calculation unit 103 calculates a hash value of the document file that is the checking target (step S901). The hash value acquisition unit 105 acquires a block with the hash value matching the document file ID of the document file that is the checking target from the blockchain network 300 (step S902). Instead of the hash value of the document file that is the checking target, a file size of the document file that is the checking target may be used. Thus, a block with the document file ID and the file size matching those of the document file that is the checking target may be acquired from the blockchain network 300. The version determination unit 107 determines whether a block with the document file ID and the hash value matching those of the document file that is the checking target has been successfully acquired (step S903).

Upon determining that the block with the document file ID and the hash value matching those of the document file that is the checking target has been successfully acquired (step S903: Yes), the hash value acquisition unit 105 acquires version information, a file size, and a registration date and time stored in the acquired block (step S904).

The version determination unit 107 determines whether the version information stored in the latest block matches the version information stored in the acquired block (step S905). Upon determining that the version information stored in the latest block matches the version information stored in the acquired block (step S905: Yes), the version determination unit 107 determines whether the file size stored in the latest block matches the file size stored in the acquired block (step S906). Upon determining that the file size stored in the latest block matches the file size stored in the acquired block (step S906: Yes), the version determination unit 107 determines whether the registration date and time stored in the latest block matches the registration date and time stored in the acquired block (step S907). Upon determining that the registration date and time stored in the latest block matches the registration date and time stored in the acquired block (step S907: Yes), the version determination unit 107 determines that the document file that is the checking target is the latest version (step S908).

When it is determined that the version information stored in the latest block does not match the version information stored in the acquired block (step S905: No), that the file size stored in the latest block does not match the file size stored in the acquired block (step S906: No), or that the registration date and time stored in the latest block does not match the registration date and time stored in the acquired block (step S907: No), the document file that is the checking target is determined not to be the latest version (step S909).

When it is determined that the block with the document file ID and the hash value matching those of the document file that is the checking target has failed to be acquired, that is, when it is determined that the information on the document file that is the checking target is not registered in the blockchain network 300 (step S903: No), it is determined that the document file that is the checking target is not the latest version (step S910).

In the processing described above, the document file that is the checking target is determined to be the latest version when results of determination on whether the version information stored in the latest block matches the version information stored in the acquired block (step S905), determination on whether the file size stored in the latest block matches the file size stored in the acquired block (S906), and determination on whether the registration date and time stored in the latest block and the registration date and time stored in the acquired block (S907) are all positive. Alternatively, the document file that is the checking target may be determined to be the latest version when a result of any one of these determinations or a combination of two of any of these is positive.

In this manner, with a document file acquired by the user simply transmitted to the management server 100, whether the document file is the latest version stored in the block of the blockchain network 300 can be determined. Furthermore, the information on the version of the document file that is the checking target is stored in a block of the blockchain network 300, so that whether the document file that is the checking target is the latest version can be determined with a simple mechanism, without the need for establishing a complicated mechanism for version management.

Second Embodiment

Figure 10:
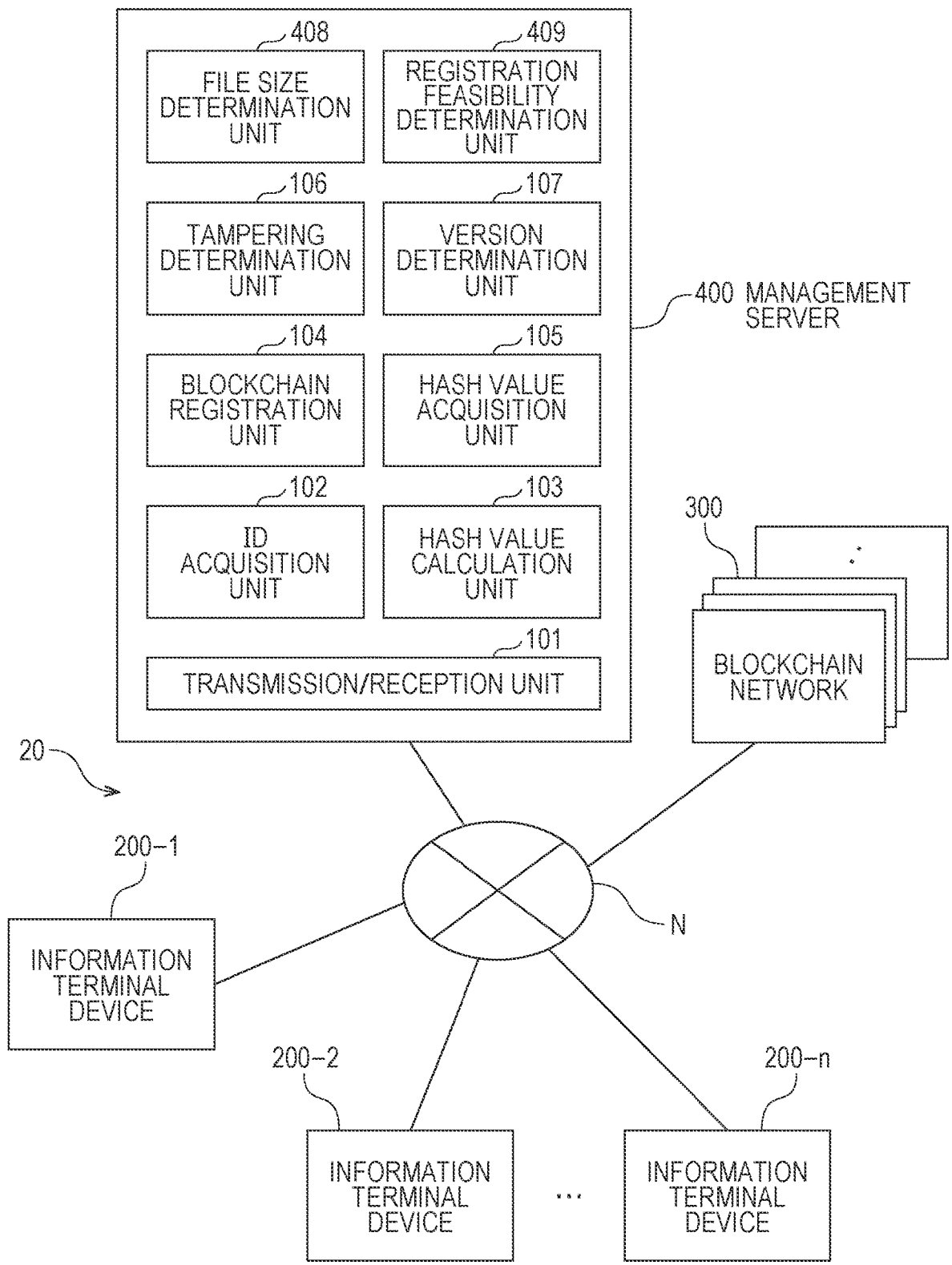
FIG. 10 is a block diagram illustrating a configuration of a document file management system 20 according to a second embodiment.

Next, a description will be given on processing of determining whether a document file (more specifically, information on the document file) that is a registration target can be registered when the document file is registered in the blockchain network 300. FIG. 10 is a block diagram illustrating a configuration of a document file management system 20 according to a second embodiment. The document file management system 20 includes a management server 400, the information terminal device 200, and the blockchain network 300, and has the management server 400, the information terminal device 200, and the blockchain network 300 communicably connected to each other via the communication network N.

The management server 400 is a server that determines whether information on a document file received from the information terminal device 200 can be registered in the blockchain network 300. The management server 400 includes the transmission/reception unit 101, the ID acquisition unit 102, the hash value calculation unit 103, the blockchain registration unit 104, the hash value acquisition unit 105, the tampering determination unit 106, the version determination unit 107, a file size determination unit 408, and a registration feasibility determination unit 409. In the present embodiment, each unit denoted with the same reference numeral as that in the first embodiment has the same function and configuration as those in the first embodiment, and thus, the above description shall be referred to for such a unit, and differences from the first embodiment will be mainly described below.

The file size determination unit 408 determines whether the file size of the document file that is the registration target is larger than the file size stored in the latest block acquired by the hash value acquisition unit 105.

The registration feasibility determination unit 409 determines whether the document file that is the registration target can be registered, based on the determination on whether the file size of the document file that is the registration target is larger than the file size stored in the latest block, determination on whether the file size of the document file as the registration target matches the file size stored in the latest block, and determination on whether the hash value of the document file that is the registration target matches the hash value stored in the latest block.

Figure 11:
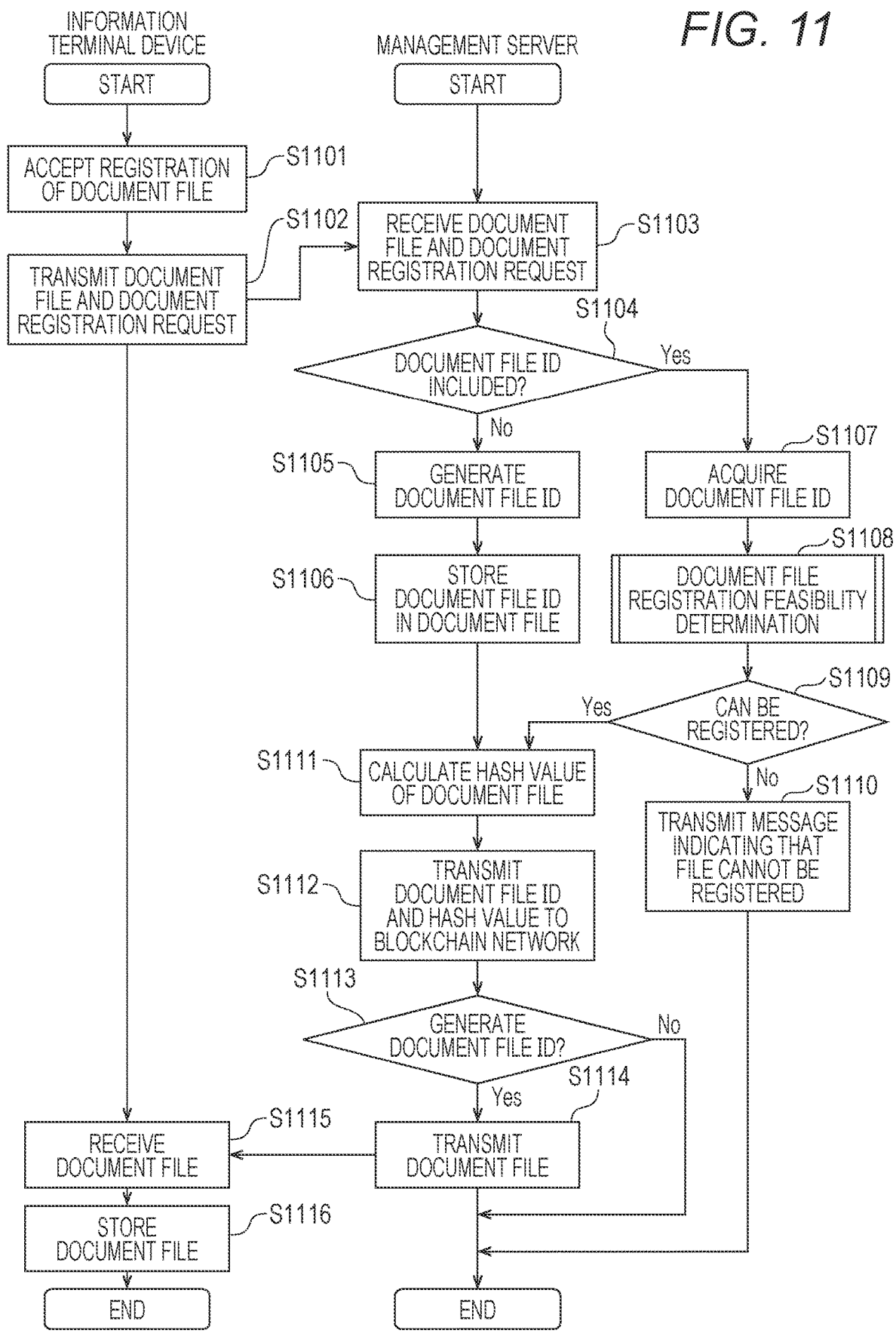
FIG. 11 is a flowchart illustrating a procedure of document file registration feasibility determination processing executed by a management server 400 and the information terminal device 200.

FIG. 11 is a flowchart illustrating a procedure of document file registration feasibility determination processing executed by the management server 400 and the information terminal device 200.

The information terminal device 200 accepts the registration of a document file (step S1101). The information terminal device 200 transmits the document file and the document registration request to the management server 400 (step S1102).

In the management server 400, the transmission/reception unit 101 receives the document file and the document registration request (step S1103). The ID acquisition unit 102 determines whether the document file ID is stored in the document file (step S1104). When the document file ID is determined not to be stored in the document file (step S1104: No), the ID acquisition unit 102 generates the document file ID (step S1105). The ID acquisition unit 102 stores the document file ID in the document file (step S1106).

When the document file ID is determined to be stored in the document file (step S1104: Yes), the ID acquisition unit 102 acquires the document file ID from the document file (step S1107). Next, the document file registration feasibility determination processing is executed (step S1108). Details of the document file registration feasibility determination processing will be described later with reference to FIG. 12. Based on the document file registration feasibility determination processing, whether the document file can be registered is determined (step S1109).

When it is determined that the document file can be registered (step S1109: Yes), the processing proceeds to step S1111. When it is determined that the document file cannot be registered (step S1109: No), the transmission/reception unit 101 transmits a message indicating that the document file cannot be registered, to the information terminal device 200 (step S1110).

The hash value calculation unit 103 calculates a hash value of the document file (step S1111). The transmission/reception unit 101 transmits the document file ID and the hash value of the document file to the blockchain network 300 (step S1112). As a result, the document file ID and the hash value of the document file that can be registered are stored in a block of the blockchain network 300. In addition to the document file ID and the hash value, a file size, version information, and the like may be transmitted to the blockchain network 300 to be stored in the block of the blockchain network 300. The transmission/reception unit 101 determines whether the document file ID has been generated by the ID acquisition unit 102 (step S1113). When it is determined that the document file ID has not been generated (step S1113: No), the processing ends. Upon determining that the document file ID has been generated (step S1113: Yes), the transmission/reception unit 101 transmits the document file storing the document file ID to the information terminal device 200 (step S1114).

The information terminal device 200 receives the document file storing the document file ID (step S1115). The information terminal device 200 stores the document file storing the document file ID (step S1116). More specifically, the information terminal device 200 replaces the document file transmitted to the management server 400 with the document file received from the management server 400. Thus, the document file the document file ID of which has not been originally held can be replaced with a document file storing the document file ID, whereby information on the document file stored in the block of the blockchain network 300 and the document file stored in the information terminal device 200 can be linked to each other using the document file ID.

Figure 12:
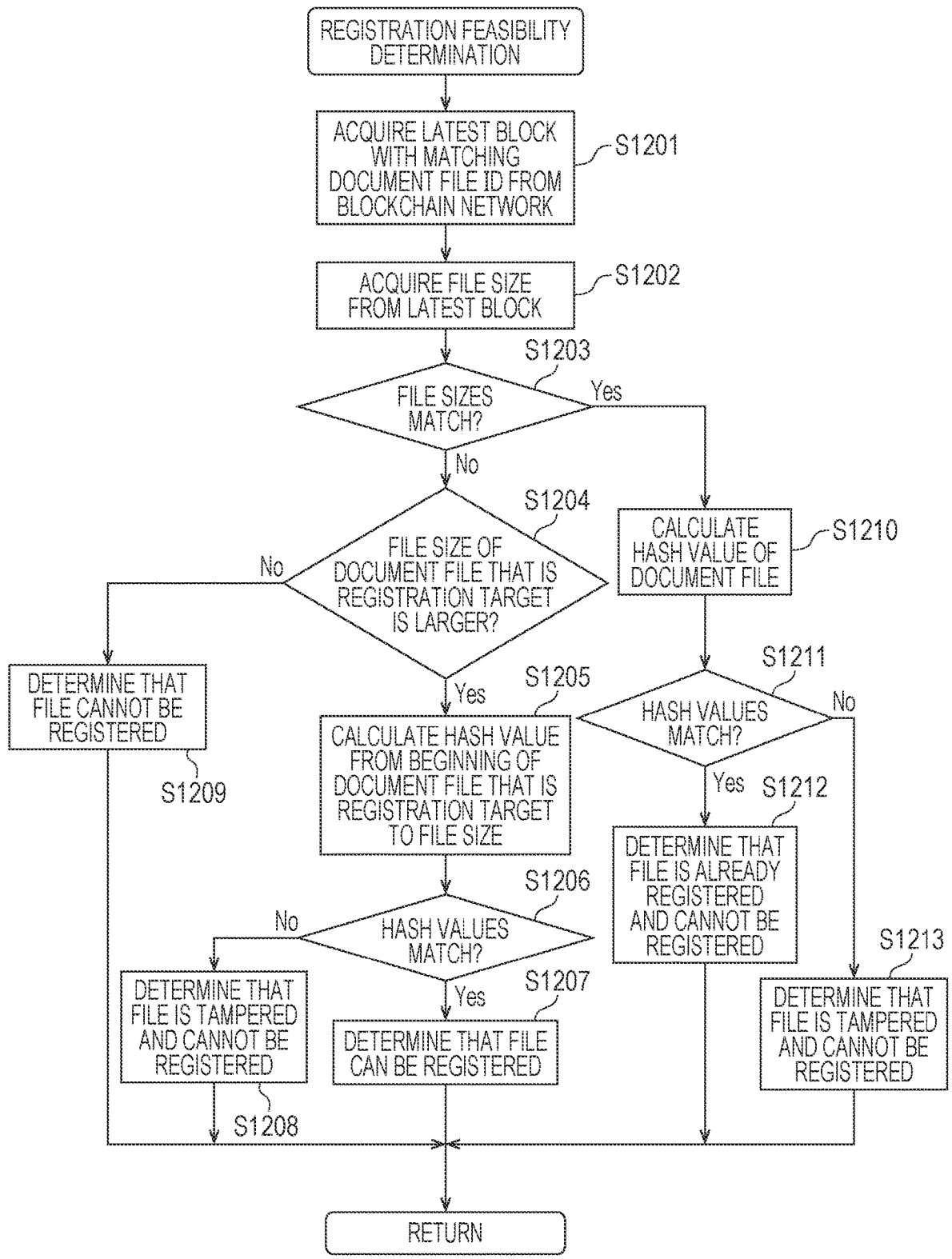
FIG. 12 is a flowchart illustrating a procedure of the document file registration feasibility determination processing executed by the management server 400.

Next, the document file registration feasibility determination processing executed by the management server 400 will be described. FIG. 12 is a flowchart illustrating a procedure of the document file registration feasibility determination processing executed by the management server 400.

The hash value acquisition unit 105 acquires the latest block with the document file ID matching that of the document file that is the registration target from the blockchain network 300 (step S1201). The hash value acquisition unit 105 acquires a file size stored in the latest block (step S1202).

The version determination unit 107 determines whether the file size stored in the latest block matches the file size of the document file that is the registration target (step S1203). When it is determined that the file size stored in the latest block does not match the file size of the document file that is the registration target (step S1203: No), the file size determination unit 408 determines whether the file size of the document file that is the registration target is larger than the file size stored in the latest block (step S1204).

When the file size of the document file that is the registration target is determined to be larger than the file size stored in the latest block (step S1204: Yes), the hash value calculation unit 103 calculates the hash value of the document file that is the registration target from the beginning to the file size stored in the latest block (step S1205). The version determination unit 107 determines whether the calculated hash value matches the hash value stored in the latest block (step S1206). When it is determined that the calculated hash value matches the hash value stored in the latest block (step S1206: Yes), the registration feasibility determination unit 409 determines that the document file that is the registration target can be registered (step S1207). When it is determined that the calculated hash value does not match the hash value stored in the latest block (step S1206: No), the registration feasibility determination unit 409 determines that the document file that is the registration target is tampered and thus the document file that is the registration target cannot be registered (step S1208).

When it is determined that the file size of the document file that is the registration target is not larger than the file size stored in the latest block (step S1204: No), the registration feasibility determination unit 409 determines that the document file that is the registration target cannot be registered (step S1209).

When it is determined that the file size stored in the latest block matches the file size of the document file that is the registration target (step S1203: Yes), the hash value calculation unit 103 calculates a hash value of the document file that is the registration target (step S1210). The version determination unit 107 determines whether the calculated hash value matches the hash value stored in the latest block (step S1211). When it is determined that the calculated hash value matches the hash value stored in the latest block (step S1211: Yes), the registration feasibility determination unit 409 determines that the document file that is the registration target has already been registered and thus cannot be registered (step S1212). When it is determined that the calculated hash value does not match the hash value stored in the latest block (step S1211: No), the registration feasibility determination unit 409 determines that the document file that is the registration target is tampered and thus cannot be registered (step S1213).

When the information on the document file is registered and managed in the blockchain network 300 as described above, document files other than a new document file or document files with which the updated contents are added to the document file corresponding to the latest block among the blocks corresponding to the respective versions stored in the blockchain network 300 are determined to be not registerable. Thus, with the blockchain network 300, the document files can be managed with no branching versions. For example, with information on the document file of the original document, the document file of original document+update 1, the document file of original document+update 1+update 2 as illustrated in FIG. 6 registered, attempt to register information on a document file of original document+update 1+update 3 in the blockchain network 300 results in determination that the file cannot be registered, and thus information on the document file is not registered.

The management server 100, the information terminal device 200, and the management server 400 according to the above-described embodiments is a normal computer including hardware such as a central processing unit (CPU), an external storage device such as a read only memory (ROM), a random access memory (RAM), and a hard disk drive (HDD), a communication control device, and the like, and the CPU reads and operates a program stored in the ROM, the RAM, the HDD, and the like to implement the above-described configuration and functions.

A program operating on the management server 100, the information terminal device 200, and the management server 400 may be stored in a computer connected to a network such as the Internet and provided by being downloaded via the network, or may be provided by being recorded in a computer-readable recording medium such as a CD-ROM, a DVD, a USB memory, or an SD card as a file in an installable format or an executable format. A program for implementing the above-described functions and processing may be provided in a use form such as an application programming interface (API), software as a service (SaaS), or cloud computing.

Note that the present invention is not limited to the direct definition of the above-described embodiments, and does not necessarily have to be physically configured as illustrated. In addition, the present invention can be configured by functionally or physically dividing, integrating, replacing, modifying, or deleting all or some of the components described in the embodiments in any units according to various loads, usage conditions, and the like.

REFERENCE SIGNS LIST

10 Document file management system
100 Management server
101 Transmission/reception unit
102 ID acquisition unit
103 Hash value calculation unit
104 Blockchain registration unit
105 Hash value acquisition unit
106 Tampering determination unit
107 Version determination unit
200 Information terminal device
300 Blockchain network
400 Management server
408 File size determination unit
409 Registration feasibility determination unit
N Network

The invention claimed is:

1. A management server connected to an information terminal device and a blockchain network for storing a hash value, a file size, and a non-hashed document file ID each time a PDF file is registered via a network, the management server comprising:
  a reception unit that receives, from the information terminal device, a PDF file for adding to an original document, an updated content of the original document as incremental update in the order of update;
  a hash value calculation unit that calculates a hash value of the PDF file received by the reception unit;
  a document file ID acquisition unit that checks whether a non-hashed document file ID exists on the PDF file received by the reception unit, wherein said document file ID acquisition unit acquires_the non-hashed document file ID and uses the non-hashed document file ID to identify the PDF file if the non-hashed document file ID is included in the PDF file received by the reception unit, and wherein said document file ID acquisition unit creates and includes a new non-hashed document file ID to the PDF file received by the reception unit and transmits a copy of the PDF file back to the information terminal device to replace the PDF file on the information terminal device if the non-hashed document file ID is not included in the PDF file received by the reception unit;
  a hash value acquisition unit that uses the non-hashed document file ID from the document file ID acquisition unit to acquire from the blockchain network to which a block storing the hash value of the PDF file, the non-hashed document file ID, and a file size of the PDF file in association with each other is registered each time the PDF file is updated, a hash value and a file size stored in a latest block among blocks storing the non-hashed document file ID acquired by the document file ID acquisition unit;
  a tampering determination unit that determines whether the PDF file received by the reception unit is tampered, by determining whether the hash value calculated by the hash value calculation unit matches the hash value acquired by the hash value acquisition unit and by determining whether a file size of the PDF file received by the reception unit matches the file size acquired by the hash value acquisition unit; and
  a transmission unit that transmits a determination result obtained by the tampering determination unit to the information terminal device.

2. The management server according to claim 1 further comprising
  a version determination unit that stores version information on the_PDF file in association with the non-hashed document file ID in a block to be registered in the blockchain network, and determines that the version information stored in the latest block is version information on the_PDF file, when the tampering determination unit determines that no tampering has been done, wherein the transmission unit transmits a determination result obtained by the version determination unit to the information terminal device.

3. A management server connected to an information terminal device via a network, the management server comprising:

a reception unit that receives, from the information terminal device, a PDF file for adding to an original document, an updated content of the original document as incremental update in the order of update;

a document file ID acquisition unit that checks whether a non-hashed document file ID exists on the PDF file received by the reception unit, wherein said document file ID acquisition unit acquires_the non-hashed document file ID and uses the non-hashed document file ID to identify the PDF file if the non-hashed document file ID is included in the PDF file received by the reception unit, and wherein said document file ID acquisition unit creates and includes a new non-hashed document file ID to the PDF file received by the reception unit and transmits a copy of the PDF file back to the information terminal device to replace the PDF file in the information terminal device if the non-hashed document file ID is not included in the PDF file received by the reception unit;

a hash value acquisition unit that uses the non-hashed document file ID from the document file ID acquisition unit to acquire from a blockchain network to which a block a hash value of the PDF file, the non-hashed_document file ID, and a file size of the PDF file in association with each other, is registered each time the PDF file is updated, a file size stored in a latest block among blocks storing the non-hashed_document file ID acquired by the document file ID acquisition unit;

a version determination unit that determines whether the PDF file is latest by determining whether a file size stored in the latest block among blocks acquired by the hash value acquisition unit and a file size of the_PDF file match; and a transmission unit that transmits a determination result obtained by the version determination unit to the information terminal device.

4. The management server according to claim 3 further comprising:

a hash value calculation unit that calculates a hash value of the PDF file received by the reception unit; and a tampering determination unit that determines whether the_PDF file is tampered, by determining whether a hash value stored in the latest block and the hash value calculated by the hash value calculation unit match, when the version determination unit determines that a file size stored in the latest block and a file size of the_PDF file match.

5. The management server according to claim 3, wherein the version determination unit determines that the_PDF file is not a latest version when the file size stored in the latest block and the file size of the_PDF file are determined not to match.

6. The management server according to claim 3 wherein the version determination unit determines version information stored in the block to be version information on the PDF file and that no unregistered update has been made, when a file size stored in the block among blocks storing the non-hashed document file ID acquired from the blockchain network by the hash value acquisition unit is determined to match the file size of the_PDF file and when a hash value stored in the block and a hash value of the PDF file are determined to match.

7. The management server according to claim 3, wherein the version determination unit determines version information stored in the block to be version information on the_PDF file and that an unregistered update has been made, when a file size stored in the block among blocks storing the non-hashed document file ID acquired from the blockchain network by the hash value acquisition unit is determined not to match the file size of the_PDF file and when a hash value stored in the block and a hash value of the PDF file from a beginning of the PDF file to the file size are determined to match.

8. The management server according to claim 3, wherein the hash value acquisition unit acquires, from the blockchain network, one or more hash values, file sizes, and pieces of version information corresponding to the non-hashed document file ID included in the PDF file received by the reception unit, the version determination unit acquires a file size of the_PDF file and determines whether there is the file size, acquired by the hash value acquisition unit, matching the acquired file size, and when there is the matching file size, compares a hash value corresponding to the file size acquired by the hash value acquisition unit with a hash value of the PDF file, and when the hash values match, determines that the version information corresponding to the file size acquired by the hash value acquisition unit is a version of the_PDF file and that no unregistered update has been made on the blockchain network.

9. The management server according to claim 8, wherein when the file size matching the file size of the_PDF file is absent, the version determination unit selects a file size smaller than the file size of the PDF file acquired by the hash value acquisition unit and calculates a hash value from a beginning of the PDF file to the selected file size, compares the calculated hash value with a hash value corresponding to the selected file size, and determines that the version information corresponding to the file size is the version of the_PDF file and that the unregistered update has been made on the blockchain network when the hash values match.

10. The management server according to claim 8, wherein the reception unit receives the PDF file and a document registration request from the information terminal device, and the management server further comprises:

a hash value calculation unit that calculates a hash value, a file size, and version information on the PDF file; and a blockchain registration unit that registers the non-hashed document file ID, the hash value, the file size, and the version information in the blockchain network.

11. The management server according to claim 10, wherein the blockchain registration unit registers, in the blockchain network, the non-hashed document file ID, the hash value, the file size, and the version information together with a registration date and time that is a date and time of storage in the blockchain network.

12. A management server connected to an information terminal device via a network, the management server comprising:

a reception unit that receives, from the information terminal device, a_PDF file for adding to an original document, an updated content of the original document as incremental update in the order of update;

a document file ID acquisition unit that checks whether a non-hashed document file ID exists on the PDF file received by the reception unit, wherein said document file ID acquisition unit acquires_the non-hashed document file ID and uses the non-hashed document file ID to identify the PDF file if the non-hashed document file ID is included in the PDF file received by the reception unit, and wherein said document file ID acquisition unit creates and includes a new non-hashed document file ID to the PDF file received by the reception unit and transmits a copy of the PDF file back to the information terminal device to replace the PDF file on the information terminal device if the non-hashed document file ID is not included in the PDF file received by the reception unit;

a hash value acquisition unit that that uses the non-hashed document file ID from the document file ID acquisition unit to acquire from a blockchain network to which a block storing a hash value of the PDF file, the non-hashed document file ID, and a file size of the PDF file in association with each other, is registered each time the PDF file is updated, a hash value and a file size stored in a latest block among blocks storing the non-hashed document file ID acquired by the document file ID acquisition unit;

a file size determination unit that determines whether a file size of the_PDF file is larger than the file size stored in the latest block acquired by the hash value acquisition unit;

a hash value calculation unit that calculates a hash value of the PDF file received by the reception unit from a beginning to the file size stored in the latest block;

a registration feasibility determination unit that determines that the PDF file is able to be registered, when the file size determination unit determines that the file size of the PDF file is larger than the file size stored in the latest block acquired by the hash value acquisition unit, and when the hash value stored in the latest block acquired by the hash value acquisition unit and the hash value calculated by the hash value calculation unit match; and a transmission unit that transmits a determination result obtained by the registration feasibility determination unit to the information terminal device.

13. The management server according to claim 12, wherein the file size determination unit determines whether the file size of the PDF file matches the file size stored in the latest block acquired by the hash value acquisition unit, and the registration feasibility determination unit determines that the_PDF file is already registered and is unable to be registered, when the file size determination unit determines that the file size of the PDF file and the file size stored in the latest block acquired by the hash value acquisition unit match.

14. The management server according to claim 12, wherein the registration feasibility determination unit determines that the PDF file is unable to be registered, when the file size determination unit determines that the file size of the_PDF file is smaller than the file size stored in the latest block acquired by the hash value acquisition unit.

15. A PDF file management method executed by a computer, the PDF file management method comprising:

a receiving step of receiving a PDF file for adding to an original document, an updated content of the original document as incremental update in the order of update;

a hash value calculation step of calculating a hash value of the_PDF file received by the receiving step;

a document file ID acquiring step of checking whether a non-hashed document file ID exists on the PDF file received by the receiving step, and, if the non-hashed document file ID is included in the PDF file received by the receiving step, acquiring the non-hashed document file ID that is included in the PDF file received by the receiving step, and, if the non-hashed document file ID is not included in the PDF file received by the receiving step, creating and including a new non-hashed document file ID to the PDF file received by the receiving step and transmitting a copy of the PDF file back to an information terminal device to replace the PDF file on the information terminal device;

a hash value acquiring step of using the non-hashed document file ID from the document file ID acquisition step to acquire from a blockchain network to which a block storing a hash value of the PDF file, the non-hashed document file ID, and a file size of the PDF file in association with each other, is registered each time the PDF file is updated, a hash value and a file size stored in a latest block among blocks storing the non-hashed document file ID acquired by the document file ID acquiring step;

a tampering determining step of determining whether the PDF file is tampered, by determining whether the hash value calculated by the hash value calculation step matches the hash value acquired by the hash value acquiring step and by determining whether a file size of the PDF file received by the receiving step matches the file size acquired by the hash value acquiring step; and a transmitting step of transmitting a determination result obtained by the tampering determining step.

16. A PDF file management method executed by a computer, the PDF file management method comprising:

a receiving step of receiving a PDF file for adding to an original document, an updated content of the original document as incremental update in the order of update;

a document file ID acquiring step of checking whether a non-hashed document file ID exists on the PDF file received by the receiving step, and, if the non-hashed document file ID is included in the PDF file received by the receiving step, acquiring—the non-hashed document file ID that identifies the PDF file from the PDF file received by the receiving step, and, if the non-hashed document file ID is not included in the PDF file received by the receiving step, creating and including a new non-hashed document file ID that identifies the PDF file to the PDF file received by the receiving step and transmitting a copy of the PDF file back to an information terminal device network to replace the PDF file on the information terminal device network;

a hash value acquiring step of using the non-hashed document file ID from the document file ID acquisition step to acquire from a blockchain network to which a block storing a hash value of the_PDF file, the non-hashed document file ID, and a file size of the_PDF file in association with each other is registered each time the PDF file is updated, a file size stored in a latest block among blocks storing the non-hashed_document file ID acquired by the document file ID acquiring step;

a version determining step of determining whether the PDF file is latest by determining whether a file size stored in the latest block among blocks acquired by the hash value acquiring step and a file size of the PDF file match; and a transmitting step of transmitting a determination result obtained by the version determining step.

17. The PDF file management method according to claim 16, wherein the hash value acquiring step includes acquiring, from the blockchain network, one or more hash values, file sizes, and pieces of version information corresponding to the non-hashed document file ID included in the PDF file received by the receiving step, the version determining step includes acquiring a file size of the PDF file and determining whether there is the file size, acquired by the hash value acquiring step, matching the acquired file size, and when there is the matching file size, comparing a hash value corresponding to the file size acquired by the hash value acquiring step with a hash value of the PDF file, and when the hash values match, determining that the version information corresponding to the file size acquired by the hash value acquisition step is a version of the PDF file and that no unregistered update has been made on the blockchain network.

18. A PDF file management method executed by a computer, the PDF file management method comprising:

a receiving step of receiving a PDF file for adding to an original document, an updated content of the original document as incremental update in the order of update;

a document file ID acquiring step of checking whether a non-hashed document file ID exists on the PDF file received by the receiving step, and, if the non-hashed document file ID is included in the PDF file received by the receiving step, acquiring—the non-hashed document file ID that identifies the -PDF file from the PDF file received by the receiving step, and, if the non-hashed document file ID is not included in the PDF file received by the receiving step, creating and including a new non-hashed document file ID that identifies the PDF file to the PDF file received by the receiving step and transmitting a copy of the PDF file back to an information terminal device to replace the PDF file on the information terminal device;

a hash value acquiring step of acquiring, from a blockchain network to which a block storing a hash value of the_PDF file, the non-hashed document file ID, and a file size of the PDF file in association with each other, is registered each time the_PDF file is updated, a hash value and a file size stored in a latest block among blocks storing the non-hashed document file ID acquired by the document file ID acquiring step;

a file size determining step of determining whether a file size of the PDF file is larger than the file size stored in the latest block acquired by the hash value acquiring step;

a hash value calculation step of calculating a hash value of the PDF file received by the receiving step from a beginning to the file size stored in the latest block; and a registration feasibility determining step of determining that the_PDF is able to be registered, when it is determined in the file size determining step that the file size of the_PDF file is larger than the file size stored in the latest block acquired by the hash value acquiring step, and when the hash value stored in the latest block acquired by the hash value acquiring step and the hash value calculated by the hash value calculation step match.

19. A computer-readable recording medium recording a PDF file management program for causing a computer to execute the PDF file management method according to claim 15.

20. A computer-readable recording medium recording a PDF file management program for causing a computer to execute the PDF file management method according to claim 16.

21. A computer-readable recording medium recording a PDF file management program for causing a computer to execute the documentPDF file management method according to claim 17.

22. A computer-readable recording medium recording a PDF file management program for causing a computer to execute the PDF file management method according to claim 18.

* * * * *